US010464049B2

(12) United States Patent
Faure et al.

(10) Patent No.: US 10,464,049 B2
(45) Date of Patent: Nov. 5, 2019

(54) PROCESS TO SYNTHESIZE A CATALYST PERFORMING WATER-GAS SHIFT REACTION AT A HIGH TEMPERATURE

(71) Applicants: L'Air Liquide, Société Anonyme pour l'Etude et l'Exploitation des Procédés Georges Claude, Paris (FR); Alma Mater Studiorum Università di Bologna, Bologna (IT)

(72) Inventors: Raphaël Faure, Saint Rémy les Chevreuses (FR); Giuseppe Fornasari, Bologna (IT); Daniel Gary, Montigny le Bretonneux (FR); Carlo Lucarelli, Bologna (IT); Nicola Schiaroli, Roncitelli de Senigallia (IT); Angelo Vaccari, Bologna (IT)

(73) Assignees: L'Air Liquide, Société Anonyme pour l'Etude et l'Exploitation des Procédés Georges Claude, Paris (FR); Alma Mater Studiorum Universita de Bologna, Bologna (IT)

( * ) Notice: Subject to any disclaimer, the term of this patent is extended or adjusted under 35 U.S.C. 154(b) by 0 days.

(21) Appl. No.: 15/611,861

(22) Filed: Jun. 2, 2017

(65) Prior Publication Data
US 2017/0348675 A1 Dec. 7, 2017

(30) Foreign Application Priority Data

Jun. 7, 2016 (EP) .................................... 16305660

(51) Int. Cl.
*B01J 23/825* (2006.01)
*B01J 23/00* (2006.01)
(Continued)

(52) U.S. Cl.
CPC ............. *B01J 23/825* (2013.01); *B01J 21/04* (2013.01); *B01J 23/005* (2013.01); *B01J 23/007* (2013.01);
(Continued)

(58) Field of Classification Search
CPC ...... B01J 23/825; B01J 37/03; B01J 35/1019; B01J 35/1014; B01J 35/0066;
(Continued)

(56) References Cited

U.S. PATENT DOCUMENTS 4,835,132 A 5/1989 Sambrook
6,693,057 B1 * 2/2004 Cai .......................... B01J 23/80
502/342

(Continued)

FOREIGN PATENT DOCUMENTS

EP 2016 0061480 6/2010

OTHER PUBLICATIONS

European Search Report and Written Opinion for corresponding EP 16 30 5660, Nov. 10, 2016.

*Primary Examiner* — Anthony J Zimmer
(74) *Attorney, Agent, or Firm* — Elwood L. Haynes

(57) ABSTRACT

A process to synthesize a catalyst performing Water-Gas shift reaction at a temperature more than 300° C. using a precursor having general formula $[(Cu, Zn)_{1-x} (Al, M)_x (OH)_2]^{x+} (A^{n-}{}_{x/n}).kH_2O$ with M=Al, La, Ga or In, A=$CO_3$, $0.33 < x < 0.5$, $1 < n < 3$.

7 Claims, 5 Drawing Sheets

(51) Int. Cl.
- *B01J 23/80* (2006.01)
- *B01J 23/83* (2006.01)
- *B01J 37/02* (2006.01)
- *B01J 37/03* (2006.01)
- *B01J 37/06* (2006.01)
- *B01J 37/08* (2006.01)
- *C01B 3/58* (2006.01)
- *B01J 21/04* (2006.01)
- *B01J 35/00* (2006.01)
- *B01J 35/10* (2006.01)
- *B01J 37/00* (2006.01)

(52) U.S. Cl.
CPC ............... *B01J 23/80* (2013.01); *B01J 23/83* (2013.01); *B01J 35/0053* (2013.01); *B01J 35/0066* (2013.01); *B01J 35/1014* (2013.01); *B01J 35/1019* (2013.01); *B01J 37/0036* (2013.01); *B01J 37/0207* (2013.01); *B01J 37/0236* (2013.01); *B01J 37/03* (2013.01); *B01J 37/06* (2013.01); *B01J 37/08* (2013.01); *B01J 37/088* (2013.01); *C01B 3/583* (2013.01); *C01B 2203/044* (2013.01)

(58) Field of Classification Search
CPC ...... B01J 35/0053; B01J 23/007; B01J 21/04; B01J 37/088; B01J 23/005; B01J 23/80; B01J 37/0207; B01J 23/83; B01J 37/0236; B01J 37/06; B01J 37/08; B01J 37/0036; C01B 3/583; C01B 2203/044
See application file for complete search history.

(56) References Cited

U.S. PATENT DOCUMENTS

2010/0112397 A1* 5/2010 Takatsu ................... B01J 23/80
                                                          429/423
2014/0309102 A1  10/2014 Basile et al.

* cited by examiner

PROCESS TO SYNTHESIZE A CATALYST PERFORMING WATER-GAS SHIFT REACTION AT A HIGH TEMPERATURE

CROSS REFERENCE TO RELATED APPLICATIONS

This application claims the benefit of priority under 35 U.S.C. § 119 (a) and (b) to European Patent Application No. 16305660.9 filed Jun. 7, 2016, the entire contents of which are incorporated herein by reference.

BACKGROUND

The present invention concerns a process to synthesize a catalyst performing Water-Gas shift reaction at a temperature more than 300° C. corresponding to a high temperature (HTS).

Commercial HTS catalysts are today mostly made of Fe and Cr oxide. Plant operating issues can result from catalyst deactivation if the plant is operated at low steam loadings, due to the reduction of Fe oxide to metallic Fe that catalyze in these conditions the hydrocarbon and coke formation. Moreover the use of Cr is today in contradiction with safe plant operation, as Cr (VI) is harmful for grounds, plants, animals and humans.

The water gas shift (WGS) reaction plays a key role in Steam Reforming (SR) plants, increasing the H2 production and reducing the CO content in the exit stream. The WGS reaction is most of the time performed in two successive steps: High Temperature Water-Gas Shift (HTS) and Low-Temperature Water Gas Shift (LTS). The high temperature step is generally performed on Iron and Chromium oxides based catalysts, at temperatures higher than 350° C., while the second step is performed at lower temperature (200° C.) using Cu-based catalysts.

Main advantages to use HTS technology are:
Lowest production of by-products, like low molecular weight alcohols, that are favored by decreasing temperature and increasing Cu-content
Lowest production of steam, strong advantage when steam is not or not well valorized by the plant
Able to accept higher content of CO, resultant exothermic effect is not an issue because the catalyst is more robust against sintering
Most robust against poisoning The catalyst present in the first reactor is sensitive to operating conditions. Low steam content in process gas can irreversibly damage Fe-based catalysts, by formation of iron carbides or metallic iron, hence changing the selectivity of the catalyst and increasing hydrocarbon content in the product gas. In addition, Chromium-containing catalysts are harmful for health and environment and their production and use are today subjected to stringent regulations.

Removing chromium from HTS catalysts has already been attempted. However, such catalysts are still submitted to reduction of Iron oxide, hence being likely deactivated at low water content in process gas.

So, a problem is to provide an improved catalyst.

SUMMARY

A solution is a process to synthesize a catalyst performing Water-Gas shift reaction at a temperature more than 300° C. using a precursor having general formula:

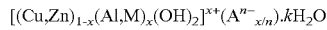

with:
M=Al, La, Ga or In,
A=CO$_3$
0.33<x<0.50
1<n<3

This precursor is a HT precursor (HT: Hydrotalcite-like compound).

Depending on the case, the adsorbent mixture according to the invention may have one or more of the following characteristics:
the process comprises the following steps:
a) synthesis of precursor by coprecipitation method;
b) washing of precursor,
c) drying of precursor at a temperature between 60° C. and 80° C.
d) calcination at a temperature more than 500° C.
the step d) lasts between 2 h and 6 h with a speed in temperature rise between 5° C./min and 10° C./min.
the step b) the precursor is washed with deionized water at a temperature between 25° C. and 60° C.
the synthesis of precursor comprises the following steps:
i) preparation of a copper, zinc, and aluminium salts aqueous solution,
ii) droping of aqueous solution into a solution containing of sodium bicarbonate by maintaining the pH to 9.0±0.1 to obtain a precipitate,
iii) ageing of this precipitate.
the precursor has 0.5 to 5 wt % of copper and the catalyst has 0.5 to 5 wt % of copper.
after the step d) the catalyst is doped with between 0.5 wt. % and 2 wt. % K.
the precursor comprises Ga with Al/Ga ratio comprised between 0/1 and 100/1.
the precursor is selected from: [Cu$_{0.042}$Zn$_{0.458}$Al$_{0.500}$(OH)$_2$]$^{0.50+}$(CO$_3^{2-}$)$_{0.25}$kH$_2$O, [Cu$_{0.042}$Zn$_{0.458}$Al$_{0.490}$La$_{0.010}$(OH)$_2$]$^{0.50+}$(CO$_3^{2-}$)$_{0.25}$kH$_2$O, [CU$_{0.042}$Zn$_{0.458}$Al$_{0.490}$Ga$_{0.010}$(OH)$_2$]$^{0.50+}$(CO$_3^{2-}$)$_{0.25}$kH$_2$O, [Cu$_{0.042}$Zn$_{0.458}$Al$_{0.490}$In$_{0.010}$(OH)$_2$]$^{0.50+}$(CO$_3^{2-}$)$_{0.25}$kH$_2$O, [Cu$_{0.023}$Zn$_{0.643}$Al$_{0.334}$(OH)$_2$]$^{0.34+}$(CO$_3^{2-}$)$_{0.17}$kH$_2$O, [CU$_{0.023}$Zn$_{0.643}$Al$_{0.327}$La$_{0.007}$(OH)$_2$]$^{0.34+}$(CO$_3^{2-}$)$_{0.17}$kH$_2$O, et[Cu$_{0.022}$Zn$_{0.645}$Al$_{0.327}$Ga$_{0.007}$(OH)$_2$]$^{0.34+}$(CO$_3^{2-}$)$_{0.17}$kH$_2$O.
the catalyst has the general formula:

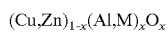

The catalyst obtained by the process according to the invention is preferably used for the conversion of CO from a synthesis gas mixture with a Steam/Dry Gas ratio of 0.1 to 0.9.

The invention is related to the possibility to obtain high activity, selectivity and stability of Cu-containing catalysts obtained by reduction of specific mixed oxides in which the Cu$^{2+}$ ions are imbedded after calcination of the precursors. Layered HT anionic clays, containing carbonates in the interlayers, have been used as precursors to obtain new catalysts, with very good performances due to the presence of all active elements well dispersed inside brucite-type layers of the precursors. HT phases form, by controlled calcination, mixed oxides with high thermal stability, surface area and active-phase dispersion, factors directly affecting the catalytic activity. HT precursors are prepared by co-precipitation of all the elements to obtain homogeneous precipitates.

The study refers to stable formulations that not only exhibit good physico-chemical properties in the HTS conditions, but also act as active phase in the WGS reaction.

The invention describe catalysts obtained by calcination of HT precursors, with a low Cu-content (≤5 wt. %), evidencing the inclusion of $Cu^{2+}$ ions (and, after reduction, of $Cu^0$ particles) in a stable matrix, allowing to stabilize Cu-containing species and, consequently, to avoid side reactions (methanation and/or oxygenates synthesis) and deactivation by sintering. A further improvement, was the introduction in the formulation of very small amounts of additives (M=Ga, In or La) by maintaining the preparation method and the precursor nature, that allow to improve both activity and catalyst stability with time-on-stream. Finally, the invention include also the doping of the calcined samples with small amount of K 2 wt. %) by incipient wetness impregnation.

The HT precursors according to the invention, having general formula:

$$[(Cu,Zn)_{1-x}(Al,M)_x(OH)_2]^{x+}(A^{n-}{}_{x/n}) \cdot kH_2O$$

with:
M=Al, La, Ga or In,
A=$CO_3$
0.33<x<0.50
1<n<3 were synthesized by the co-precipitation method. The HT precursors had a 1-x/x atomic ratio between 1 and 3, A Al/M atomic ratio between 0 and 100 and, preferably, from 0.5 to 5 wt. % of copper. Catalyst may be used as such or doped by incipient wetness impregnation by K salt solutions up to a K final content ≤2.0 wt. %, and preferentially ≤1.0 wt. %. The following examples describe the catalysts employed in the present invention, having only an illustrative, but not exhaustive feature.

EXAMPLES

Example 1: Preparation of Catalyst ZAC041c

This comparative example illustrates the preparation process of 20 grams of catalyst containing 4 wt. % of copper and having an atomic ratio (Cu+Zn)/Al=1, using carbonates as an intercalated anions in the hydrotalcite-type precursor. A copper, zinc and aluminium salts 2M aqueous solution is prepared from 2.988 g of 98% copper nitrate hemipentahydrate [$Cu(NO_3)_2$, $2.5H_2O$], 42.097 g of 98% zinc nitrate hexahydrate [$Zn(NO_3)_2$, $6H_2O$] and 57.902 g of 98% aluminium nitrate nonahydrate [$Al(NO_3)_2$, $9H_2O$] in 151.26 $cm^3$ of deionized water. This solution is then drop by drop poured, under energetic magnetic stirring, into a molar (1M) solution containing 25.492 g of 99.70% of sodium bicarbonate ($NaHCO_3$) in about 302.53 $cm^3$ in deionized water at 60° C., while maintaining the pH to 9.0±0.1, by a drop by drop addition of 3M aqueous solution of sodium hydroxide (NaOH). The obtained precipitate is aged well dispersed in the same condition (at 60° C. and pH=9.0) under energetic magnetic stirring for 45 min. The solid precipitate is then separated from the mother liquid by filtration with a Buchner funnel, vacuum being provided by a venture water suction device.

The resulting solid correspond to a HT compound of the formula:

$$[Cu_{0.042}Zn_{0.458}Al_{0.500}(OH)_2]^{0.50+}(CO_3^{2-})_{0.25}kH_2O,$$

This resulting solid is then washed with hot deionized water (60° C., 400 $cm^3$/g of sample) and dried overnight at 70° C. After grinding the obtained precursor, the powder is calcined at 550° C. (10° C./min) in a muffle furnace for 6 h and then formed and sieved with a size from 30 to 40 mesh.

Example 2: Preparation of Catalyst ZAC041cLa50

The preparation process is worked as in Example 1 except for the addition of $La^{3+}$ ions in the formulation with a $Al^{3+}/La^{3+}$ molar ratio equal to 50. The metal salts 2M aqueous solution is prepared from 2.988 g of 98% copper nitrate hemipentahydrate [$Cu(NO_3)_2$, $2.5H_2O$], 41.348 g of 98% zinc nitrate hexahydrate [$Zn(NO_3)_2$, $6H_2O$], 55.841 g of 98% aluminium nitrate nonahydrate [$Al(NO_3)_2$, $9H_2O$] and 0.948 g of 99.99% lanthanum nitrate hydrate [$La(NO_3)_3H_2O$] in 151.26 $cm^3$ of deionized water. This solution is then drop by drop poured, under energetic magnetic stirring, into a 1M solution containing 25.076 g of 99.70% of sodium bicarbonate ($NaHCO_3$) in about 297.60 $cm^3$ in deionized water at 60° C., while maintaining the pH to 9.0±0.1, by a drop by drop addition of 3M aqueous solution of sodium hydroxide (NaOH). The obtained precipitate is aged well dispersed in the same condition (at 60° C. and pH=9.0) under energetic magnetic stirring for 45 min. the solid precipitate is then separated from the mother liquid by filtration with a Buchner funnel, vacuum being provided by a venture water suction device.

The resulting solid correspond to a HT compound of the formula:

$$[Cu_{0.042}Zn_{0.458}Al_{0.490}La_{0.010}(OH)_2]^{0.50+}(CO_3^{2-})_{0.25}kH_2O,$$

This resulting solid is then washed with abundant hot deionized water (60° C., 400 $cm^3$/g of sample) and dried overnight at 70° C. After grinding the obtained precursor, the powder is calcined at 550° C. (10° C./min) in a muffle furnace for 6 h and then formed and sieved with a size from 30 to 40 mesh.

Example 3: Preparation of Catalyst ZAC041cGa50

The preparation process is worked as in Example 2 except for the addition of $Ga^{3+}$ instead of $La^{3+}$ ions in the formulation, maintaining a $Al^{3+}/Ga^{3+}$ molar ratio equal to 50. A copper, zinc, aluminium and gallium salts 2M aqueous solution is prepared from 2.988 g of 98% copper nitrate hemipentahydrate [$Cu(NO_3)_2$, $2.5H_2O$], 39.915 g of 98% zinc nitrate hexahydrate [$Zn(NO_3)_2$, $6H_2O$], 54.070 g of 98% aluminium nitrate nonahydrate [$Al(NO_3)_2$, $9H_2O$] and 0.919 g of 99.9% gallium nitrate tetrahydrate [$Ga(NO_3)_3 4H_2O$] in 144.08 $cm^3$ of deionized water. This solution is then drop by drop poured, under energetic magnetic stirring, into a molar 1M solution containing 24.281 g of 99.70% of sodium bicarbonate ($NaHCO_3$) in about 288.16 $cm^3$ in deionized water at 60° C., while maintaining the pH to 9.0±0.1, by a drop by drop addition of 3M aqueous solution of sodium hydroxide (NaOH). The obtained precipitate is aged well dispersed in the same condition (at 60° C. and pH=9.0) under energetic magnetic stirring for 45 min. the solid precipitate is then separated from the mother liquid by filtration with a Buchner funnel, vacuum being provided by a venture water suction device.

The resulting solid correspond to a HT compound of the formula:

$$[Cu_{0.042}Zn_{0.458}Al_{0.490}Ga_{0.010}(OH)_2]^{0.50+}(CO_3^{2-})_{0.25}kH_2O$$

This resulting solid is then washed with abundant hot deionized water (60° C., 400 $cm^3$/g of sample) and dried overnight at 70° C. After grinding the obtained precursor, the powder is calcined at 550° C. (10° C./min) in a muffle furnace for 6 h and then formed and sieved with a size from 30 to 40 mesh.

Example 4: Preparation of Catalyst ZAC041cIn50

The process of Example 2 is followed except that the $La^{3+}$ is replaced by $In^{3+}$ ions, in the metal salts solution. A copper, zinc, aluminium and Indium salts 2M aqueous solution is prepared from 2.988 g of 98% copper nitrate hemipentahydrate $[Cu(NO_3)_2, 2.5H_2O]$, 41.493 g of 98% zinc nitrate hexahydrate $[Zn(NO_3)_2, 6H_2O]$, 56.020 g of 98% aluminium nitrate nonahydrate $[Al(NO_3)_2, 9H_2O]$ and 1.142 g of 99.9% indium nitrate pentahydrate $[In(NO_3)_3, 5H_2O]$ in 149.27 cm³ of deionized water. This solution is then drop by drop poured, under energetic magnetic stirring, into a 1M solution containing 25.157 g of 99.70% of sodium bicarbonate $(NaHCO_3)$ in about 298.55 cm³ in deionized water at 60° C., while maintaining the pH to 9.0±0.1, by a drop by drop addition of 3M aqueous solution of NaOH. The obtained precipitate is aged well dispersed in the same condition (at 60° C. and pH=9.0) under energetic magnetic stirring for 45 min. the solid precipitate is then separated from the mother liquid by filtration with a Buchner funnel, vacuum being provided by a venture water suction device.

The resulting solid correspond to a HT compound of the formula:

$$[Cu_{0.042}Zn_{0.458}Al_{0.490}In_{0.010}(OH)_2]^{0.50+}(CO_3^{2-})_{0.25}kH_2O$$

This resulting solid is then washed with abundant hot deionized water (60° C., 400 cm³/g of sample) and dried overnight at 70° C. After grinding the obtained precursor, the powder is calcined at 550° C. (10° C./min) in a muffle furnace for 6 h and then formed and sieved with a size from 30 to 40 mesh.

Example 5: Preparation of Catalyst ZAC041cLa50_1K

The preparation process is worked as in Example 2; however, after calcination at 550° C. (10° C./min) in a muffle furnace for 6 h a potassium carbonate $(K_2CO_3)$ solution is used to dope the catalyst powder with 1 wt. % K. The potassium solution is prepared from 0.35 g of $K_2CO_3$ in 27 cm³ of deionized water. The calcined sample is then impregnated with this solution by Incipient Wetness Impregnation method, dried again at 120° C. for 2 h, calcined at 550° C. (10° C./min) in a muffle furnace for 2 h and then formed and sieved with a size from 30 to 40 mesh.

Example 6: Preparation of Catalyst ZAC041cGa50_1K

The preparation process is worked as in Example 3; however, after calcination at 550° C. (10° C./min) in a muffle furnace for 6 h a potassium carbonate $(K_2CO_3)$ solution is used to dope the catalyst powder with 1 wt. % K. The potassium solution is prepared from 0.35 g of $K_2CO_3$ in 27 cm³ of deionized water. The calcined sample is then impregnated with this solution by Incipient Wetness Impregnation method, dried again at 120° C. for 2 h, calcined at 550° C. (10° C./min) in a muffle furnace for 2 h and then formed and sieved with a size from 30 to 40 mesh.

Example 7: Preparation of Catalyst ZAC022c

The preparation process is worked as in Example 1 except for the Cu content which is 2 wt. % and the Metal$^{(II)}$/Metal$^{(III)}$ molar ratio, which is 2. A copper, zinc and aluminium salts 2M aqueous solution is prepared from 1.494 g of 98% copper nitrate hemipentahydrate $[Cu(NO_3)_2, 2.5H_2O]$, 54.926 g of 98% zinc nitrate hexahydrate $[Zn(NO_3)_2, 6H_2O]$ and 35.835 g of 98% aluminium nitrate nonahydrate $[Al(NO_3)_2, 9H_2O]$ in about 140.42 cm³ of deionized water. This solution is then drop by drop poured, under energetic magnetic stirring, into a 1M solution containing 15.777 g of 99.70% of sodium bicarbonate $(NaHCO_3)$ in 187.23 cm³ in deionized water at 60° C., while maintaining the pH to 9.0±0.1, by a drop by drop addition of 3M aqueous solution of sodium hydroxide (NaOH). The obtained precipitate is aged well dispersed in the same condition (at 60° C. and pH=9.0) under energetic magnetic stirring for 45 min. the solid precipitate is then separated from the mother liquid by filtration with a Buchner funnel, vacuum being provided by a venture water suction device.

The resulting solid correspond to a HT compound of the formula:

$$[Cu_{0.023}Zn_{0.643}Al_{0.334}(OH)_2]^{0.34+}(CO_3^{2-})_{0.17}kH_2O,$$

This resulting solid is then washed with abundant hot water (60° C., 400 cm³/g of sample) and dried overnight at 70° C. After grinding the obtained precursor, the powder is calcined at 550° C. (10° C./min) in a muffle furnace for 6 h and then formed and sieved with a size from 30 to 40 mesh.

Example 8: Preparation of Catalyst ZAC022c_0.5K

The preparation process is worked as in Example 7; however, after calcination at 550° C. (10° C./min) in a muffle furnace for 6 h a potassium carbonate $(K_2CO_3)$ solution is used to dope the catalyst powder with 0.5 wt. % K. The potassium solution is prepared from 0.352 g of $K_2CO_3$ in 25 cm³ of deionized water. The calcined sample is then impregnated with this solution by Incipient Wetness Impregnation method, dried again at 120° C. for 2 h, calcined at 550° C. (10° C./min) in a muffle furnace for 2 h and then formed and sieved with a size from 30 to 40 mesh.

Example 9: Preparation of Catalyst ZAC022cLa50

The preparation process is worked as in Example 7 except for the addition of $La^{3+}$ ions in the formulation with a $Al^{3+}/La^{3+}$ molar ratio equal to 50. The metal salts 2M aqueous solution is prepared from 1.494 g of 98% copper nitrate hemipentahydrate $[Cu(NO_3)_2, 2.5H_2O]$, 54.348 g of 98% zinc nitrate hexahydrate $[Zn(NO_3)_2, 6H_2O]$, 34.775 g of 98% aluminium nitrate nonahydrate $[Al(NO_3)_2, 9H_2O]$ and 0.590 g of 99.99% lanthanum nitrate hydrate $[La(NO_3)_3H_2O]$ in 139.00 cm³ of deionized water. This solution is then drop by drop poured, under energetic magnetic stirring, into a molar (1M) solution containing 15.616 g of 99.70% of sodium bicarbonate $(NaHCO_3)$ in about 185.33 cm³ in deionized water at 60° C., while maintaining the pH to 9.0±0.1, by a drop by drop addition of 3M aqueous solution of sodium hydroxide (NaOH). The obtained precipitate is aged well dispersed in the same condition (at 60° C. and pH=9.0) under energetic magnetic stirring for 45 min. the solid precipitate is then separated from the mother liquid by filtration with a Buchner funnel, vacuum being provided by a venture water suction device. The obtained precipitate is aged well dispersed in the same condition (at 60° C. and pH=9.0) under energetic magnetic stirring for 45 min. the solid precipitate is then separated from the mother liquid by filtration with a Buchner funnel, vacuum being provided by a venture water suction device.

The resulting solid correspond to a HT compound of the formula:

$$[Cu_{0.023}Zn_{0.643}Al_{0.327}La_{0.007}(OH)_2]^{0.34+}(CO_3^{2-})_{0.17}kH_2O,$$

This resulting solid is then washed with abundant hot water (60° C., 400 cm³/g of sample) and dried overnight at 70° C. After grinding the obtained precursor, the powder is calcined at 550° C. (10° C./min) in a muffle furnace for 6 h and then formed and sieved with a size from 30 to 40 mesh.

Example 10: Preparation of Catalyst ZAC022cGa50

The preparation process is worked as in Example 9 except for the addition of $Ga^{3+}$ instead of $La^{3+}$ ions in the formulation, maintaining a $Al^{3+}/Ga^{3+}$ molar ratio equal to 50. A copper, zinc, aluminium and gallium salts 2M aqueous solution is prepared from 1.494 g of 98% copper nitrate hemipentahydrate $[Cu(NO_3)_2, 2.5H_2O]$, 34.995 g of 98% zinc nitrate hexahydrate $[Zn(NO_3)_2, 6H_2O]$, 54.704 g of 98% aluminium nitrate nonahydrate $[Al(NO_3)_2, 9H_2O]$ and 0.600 g of 99.9% gallium nitrate tetrahydrate $[Ga(NO_3)_3 4H_2O]$ in 139.88 $cm^3$ of deionized water. This solution is then drop by drop poured, under energetic magnetic stirring, into a 1M solution containing 15.715 g of 99.70% of sodium bicarbonate $(NaHCO_3)$ in about 186.50 $cm^3$ in deionized water at 60° C., while maintaining the pH to 9.0±0.1, by a drop by drop addition of 3M aqueous solution of sodium hydroxide (NaOH). The obtained precipitate is aged well dispersed in the same condition (at 60° C. and pH=9.0) under energetic magnetic stirring for 45 min. the solid precipitate is then separated from the mother liquid by filtration with a Buchner funnel, vacuum being provided by a venture water suction device.

The resulting solid correspond to a HT compound of the formula:

$$[Cu_{0.022}Zn_{0.645}Al_{0.327}Ga_{0.007}(OH)_2]^{0.34+}(CO_3^{2-})_{0.17}kH_2O$$

This resulting solid is then washed with abundant hot water (60°, 400 $cm^3$/g of sample) and dried overnight at 70° C. After grinding the obtained precursor, the powder is calcined at 550° (10° C./min) in a muffle furnace for 6 h and then formed and sieved with a size from 30 to 40 mesh.

Example 11: Preparation of Catalyst ZAC022cGa50 1K

The preparation process is worked as in Example 10; however, after calcination at 550° C. (10° C./min) in a muffle furnace for 6 h a potassium carbonate $(K_2CO_3)$ solution is used to dope the catalyst powder with 1 wt. % K. The potassium solution is prepared from 0.35 g of $K_2CO_3$ in 27 $cm^3$ of deionized water. The calcined sample is then impregnated with this solution by Incipient Wetness Impregnation method, dried again at 120° C. for 2 h, calcined at 550° C. (10° C./min) in a muffle furnace for 2 h and then formed and sieved with a size from 30 to 40 mesh.

Comparative Example 12

Commercial-Like HTS Catalyst

The comparative example is a commercial-like HTS catalyst, optimized to perform the water gas shift reaction at high temperature, prepared as described in the document U.S. Pat. No. 7,998,897 and having the following wt. % composition: Zn=42; Al=21; Cu=4; K=2.

These catalysts were analyzed.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
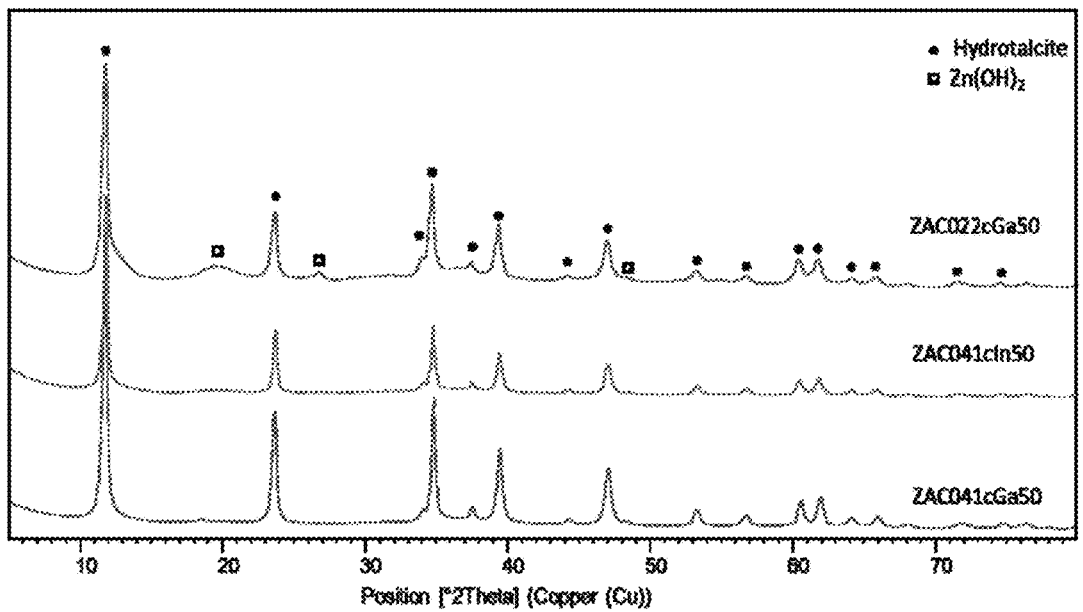
FIG. 1 illustrates the XRD (X-ray diffraction) powder patterns of some precursors (ZAC041cGa50, ZAC041cIn50 and ZAC022cGa50).

FIG. 1 shows the XRD (X-ray diffraction) powder patterns of some precursors (ZAC041cGa50, ZAC041cIn50 and ZAC022cGa50) The presence of carbonate ions during precipitation results in the HT-structure formation, as identified by XRD analysis, together with very small amounts of $Zn(OH)_2$.

Figure 2:
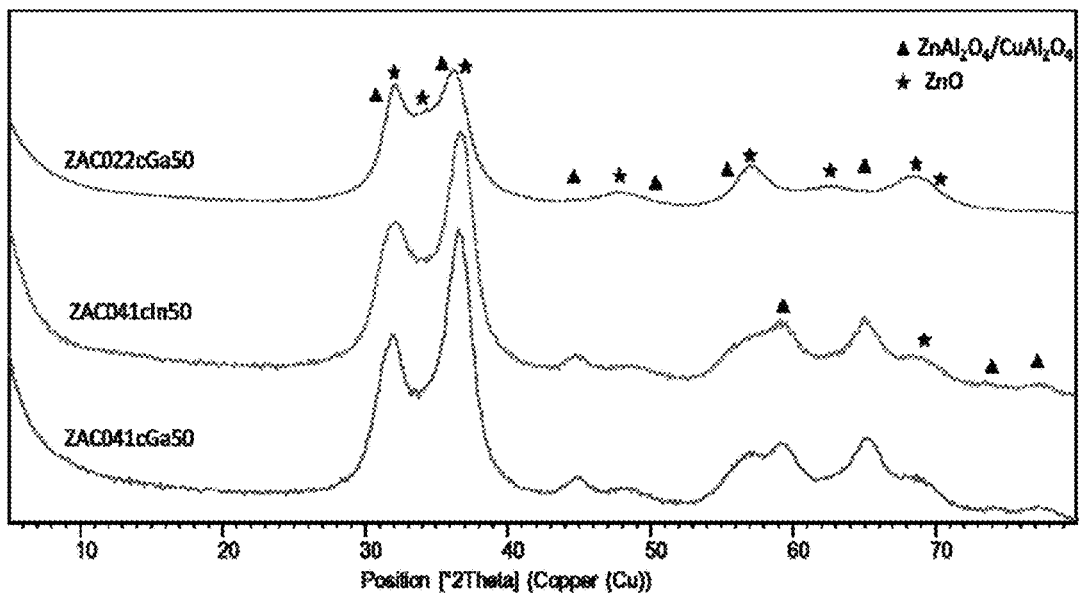
FIG. 2 illustrates the HT-structure containing carbonates topotactically evolving by calcinations.

As shown in FIG. 2, the HT-structure containing carbonates topotactically evolves by calcination and XRD patterns showed ZnO-like and $(Zn,Cu)Al_2O_4$ phases with a higher intensity of ZnO peaks in the sample with higher M(II)/M(III) or 1-x/x atomic ratio. M(II)/M(III) is the atomic ratio between the bivalent and trivalent cations inside the hydrotalcite-type precursors (obviously the GA replace partially the Al) This ratio has been claimed in the literature to obtain hydrotalcite.type phases ranging from 5 to 0.1, but the values at the extremity very probably forms also side amorphous phases. More realistically this ratio ranges from 3 to 2.

Figure 3:
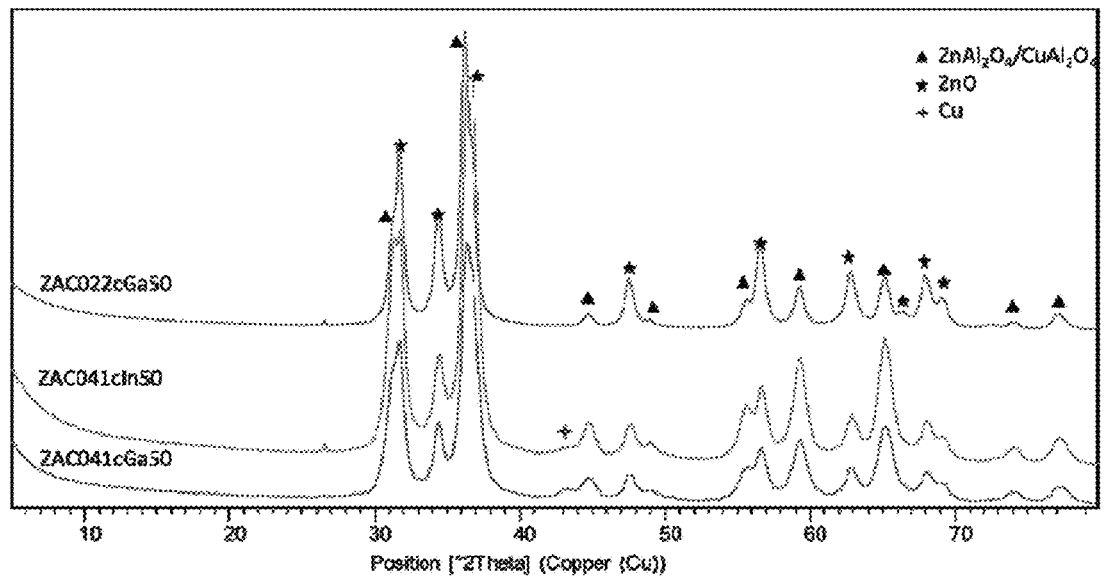
FIG. 3 illustrates that after catalytic tests the presence of more crystalline $Cu^0$.

After the catalytic tests (FIG. 3) the XRD patterns reveal the presence of the same phases as before the tests, although more crystalline. $Cu^0$ is detected in traces only in very few samples, in agreement with the low Cu content and its well dispersion in the oxide matrix.

A summary of the chemical-physical properties is reported in Table 1. A significant increase of the BET surface area and $Cu^0$ surface area (MSA) as well as Cu dispersion (D %) is observed by addition of very small amount of promoters (La, Ga or In), evidencing the positive effect of these elements on the chemical-physical properties of the obtained catalysts. On the contrary, the K-doping decrease generally all these parameters.

TABLE 1

| SAMPLE | Phases | $S_{BET}$ [m²/g] | MSA [m²/$g_{CAT}$] | D [%] |
|---|---|---|---|---|
| ZAC041c | ZnO, spinel | 73 | 1 | 4 |
| ZAC041cLa50 | ZnO, spinel | 87 | 4 | 13 |
| ZAC041cIn50 | ZnO, spinel | 103 | 6 | 22 |
| ZAC041cGa50 | ZnO, spinel | 97 | 5 | 20 |
| ZAC041cLa50_1K | ZnO, spinel | 85 | 4 | 13 |
| ZAC041cGa50_1K | ZnO, spinel | 87 | 5 | 20 |
| ZAC022c_1K | ZnO, spinel | 40 | 1 | 9 |
| ZAC022cLa50 | ZnO, spinel | 97 | 2 | 20 |
| ZAC022cGa50 | ZnO, spinel | 106 | 2 | 17 |
| ZAC022cGa50_1K | ZnO, spinel | 95 | 1 | 9 |

MSA and D % values are evaluated by $N_2O$ titration method. The sample (100 mg) is loaded in a small reactor and pre-reduced by a 80 mL/min flow of 5 vol. % $H_2/N_2$ mixture from 40 to 350° C. (10° C./min) and held at this temperature for 60 min. After the catalyst bed is flushed under He stream for 20 min to remove all the $H_2$, the reactor is cooled to 40° C. and, successively, pulses of $N_2O$ (250 μL) are introduced into a He carrier stream by a 6-port valve to selectively oxidize the $Cu^0$ surface:

$$2Cu + N_2O \rightarrow N_2 + Cu_2O$$

After each pulse, $N_2$ and $N_2O$ are separated by using a GS-Carbon Plot column and the titration occurs until no further $N_2O$ conversion is observed. A Thermal Conductivity Detector (TCD) is used to measure the effluent gas evolved via $N_2O$ decomposition. The specific surface area of $Cu^0$ was calculated from the total amount of $N_2O$ consumption, assuming a copper density of $1.46 \times 10^{19}$ $Cu^0$ atoms/m² and a molar stoichiometry of $Cu/N_2O=2$.

The HT precursors after calcination have been reduced before the catalytic tests under HTS conditions, to obtain the main active phase. A typical procedure comprises:
1) remove oxygen ($O_2$) by purging nitrogen ($N_2$) in the reactor and, after that, to heat the catalyst to 275° C. (50° C./h) and pressurize the reactor at 1.0 MPa (10 bar).
2) Introduce of the process gas (Steam+Dry Gas) at 1.0 MPa (10 bar), then ramp of 30° C./h up to 350° C., taking into account of the flow rate in the high temperature reaction conditions of the further tests.
3) At 350° C., increase of the pressure up to the value of the test. The $H_2$-TPR (TPR=Temperature Programmed Reduction with Hydrogen) profiles of the calcined catalysts before the tests show two reduction peaks, a most intense one at about 340° C., typical of the reduction of $Cu^{2+}$ species stabilized by strong interaction with the support, and a small peak at about 550° C., attributable to Cu-containing spinel-type phase. The addition of small amounts of promoters (La, Ga or In) lowers maximum of the first reduction peak of about 20° C., while that at higher temperature remains unchanged. After the catalytic tests, the first most intense peak decrease at about 200° C. with a complex shape, evidencing the formation of free CuO with different crystal size. ZnO-likes phase does not reduce under the experimental conditions.

The catalysts of the present invention together with the reference catalyst are shaped as pellets with size between 30 and 40 mesh and tested in a plug-flow reactor. The tubular reactor is heated by an oven in order to have a temperature between 350 and 450° C. (±1° C.), measured immediately at the exit of the catalytic bed, and pressurized to 15 bar. Dry Gas (DG) and Steam (S) are pre-heated (215° C.) and mixed (mass flow controller) before passing over the catalyst. In order to determine the activity in the HTS processes of the catalysts prepared by the various examples, a typical DG composition containing 18.8 vol % CO, 4.6 vol % CO2, 4.6 vol % CH4 with the balance H2 is used and passed over the pre-reduced catalysts with a steam to dry gas (S/DG) ratio of 0.55 and 0.25 v/v. Concentration of all components is regularly measured both inlet and exit dry gas by means of Agilent gas chromatograph calibrated towards a gas mixture of known composition. The Gas Hourly Space Velocity (GHSV) is between 3,600 and 14,400 h-1.

Table 2 and Table 3 summarize the catalytic results obtained for some of the catalysts claimed in the present invention, as merely illustrative, but not exhaustive examples: More specific comparisons as a function of the different parameters are illustrated in the FIGS. 4-9.

TABLE 2

Summary of the catalytic results in terms of CO conversion and $H_2$ yield

| | | T (° C.) | | | | | | |
|---|---|---|---|---|---|---|---|---|
| | | 350 | 350 | 350 | 400 | 400 | 450 | 450 |
| | | S/DG (v/v) | | | | | | |
| | | 0.55 | 0.55 | 0.55 | 0.55 | 0.55 | 0.55 | 0.55 |
| | | Contact time (s) | | | | | | |
| Catalyst | | 0.25 | 0.50 | 1.00 | 0.50 | 1.00 | 0.50 | 1.00 |
| ZAC041c | CO conv. (%) | 35 | 51 | 68 | 74 | 78 | 72 | 74 |
| | $H_2$ yield (%) | 36 | 52 | 72 | 76 | 78 | 71 | 72 |
| ZAC041cLa50 | CO conv. (%) | 70 | 84 | 87 | 74 | 81 | 73 | 73 |
| | $H_2$ yield (%) | 69 | 83 | 84 | 70 | 78 | 72 | 72 |
| ZAC041cIn50 | CO conv. (%) | 24 | 40 | 56 | 58 | 68 | 64 | 71 |
| | $H_2$ yield (%) | 26 | 41 | 56 | 58 | 69 | 62 | 72 |

TABLE 2-continued

Summary of the catalytic results in terms of CO conversion and $H_2$ yield

| | | T (° C.) | | | | | | |
|---|---|---|---|---|---|---|---|---|
| | | 350 | 350 | 350 | 400 | 400 | 450 | 450 |
| | | | | | S/DG (v/v) | | | |
| | | 0.55 | 0.55 | 0.55 | 0.55 | 0.55 | 0.55 | 0.55 |
| | | | | | Contact time (s) | | | |
| Catalyst | | 0.25 | 0.50 | 1.00 | 0.50 | 1.00 | 0.50 | 1.00 |
| ZAC041cGa50 | CO conv. (%) | 78 | 85 | 86 | 82 | 81 | 74 | 73 |
| | $H_2$ yield (%) | 80 | 88 | 89 | 86 | 85 | 79 | 78 |
| ZAC041cLa501K | CO conv. (%) | 72 | 86 | 88 | 78 | 81 | 73 | 73 |
| | $H_2$ yield (%) | 70 | 85 | 87 | 75 | 80 | 73 | 73 |
| ZAC041cGa501K | CO conv. (%) | 83 | 86 | 86 | 81 | 80 | 74 | 74 |
| | $H_2$ yield (%) | 85 | 89 | 85 | 79 | 83 | 73 | 75 |
| ZAC022c1K | CO conv. (%) | 60 | 68 | 85 | 76 | 80 | 74 | 74 |
| | $H_2$ yield (%) | 60 | 62 | 85 | 68 | 69 | 75 | 75 |
| ZAC022cGa50 | CO conv. (%) | 14 | 25 | 39 | 30 | 40 | 28 | 38 |
| | $H_2$ yield (%) | 14 | 26 | 39 | 32 | 41 | 30 | 40 |
| ZAC022cGa501K | CO conv. (%) | 39 | 59 | 73 | / | / | / | / |
| | $H_2$ yield (%) | 40 | 60 | 72 | / | / | / | / |

TABLE 3

Summary of the catalytic results in terms of $CO_2$ selectivity and amount of by-product MeOH formed

| | | T (° C.) | | | | | | |
|---|---|---|---|---|---|---|---|---|
| | | 350 | 350 | 350 | 400 | 400 | 450 | 450 |
| | | | | | S/DG (v/v) | | | |
| | | 0.55 | 0.55 | 0.55 | 0.55 | 0.55 | 0.55 | 0.55 |
| | | | | | Contact time (s) | | | |
| Catalyst | | 0.25 | 0.50 | 1.00 | 0.50 | 1.00 | 0.50 | 1.00 |
| ZAC041c | $CO_2$ sel. (%) | 98 | 100 | 96 | 97 | 97 | 100 | 98 |
| | MeOH (ppm) | 14 | 69 | 93 | 50 | 57 | 26 | 19 |
| ZAC041cLa50 | $CO_2$ sel. (%) | 96 | 96 | 98 | 100 | 98 | 97 | 98 |
| | MeOH (ppm) | 123 | 172 | 248 | 135 | 131 | 48 | 31 |
| ZAC041cIn50 | $CO_2$ sel. (%) | 98 | 100 | 98 | 99 | 98 | 100 | 99 |
| | MeOH (ppm) | 45 | 167 | 209 | 183 | 173 | 193 | 84 |
| ZAC041cGa50 | $CO_2$ sel. (%) | 96 | 96 | 90 | 95 | 97 | 98 | 99 |
| | MeOH (ppm) | 332 | 455 | 526 | 232 | 203 | 80 | 68 |
| ZAC041cLa501K | $CO_2$ sel. (%) | 96 | 96 | 98 | 100 | 98 | 97 | 98 |
| | MeOH (ppm) | 106 | 263 | 372 | 235 | 171 | 118 | 40 |
| ZAC041cGa501K | $CO_2$ sel. (%) | 99 | 100 | 96 | 99 | 100 | 100 | 100 |
| | MeOH (ppm) | 494 | 649 | 692 | 269 | 162 | 104 | 67 |
| ZAC022c1K | $CO_2$ sel. (%) | 100 | 99 | 100 | 99 | 99 | 90 | 86 |
| | MeOH (ppm) | 43 | 57 | 21 | 52 | 68 | 32 | 21 |
| ZAC022cGa50 | $CO_2$ sel. (%) | 100 | 100 | 95 | 100 | 97 | 100 | 100 |
| | MeOH (ppm) | 74 | 115 | 148 | 60 | 50 | 27 | 20 |
| ZAC022cGa501K | $CO_2$ sel. (%) | 100 | 97 | 97 | / | / | / | / |
| | MeOH (ppm) | 80 | 164 | 263 | / | / | / | / |

Table 2, shows that the catalysts present generally a good catalytic activity, with significantly better results observed for the samples with lower M(II)/M(II) or 1-x/x atomic ratio. At 400° and 450° C. almost all the catalyst approach the thermodynamic equilibrium value regardless of the contact time value. The replacement of small amount of Al by In (Al/In=50 as atomic ratio) worsen the catalytic activity unlike that observed adding small amount of La and, surprisingly, Ga. This latter catalyst exhibits, as doped or K-doped, very good catalytic performances, reaching the thermodynamic equilibrium values also for the lowest temperature investigated, i.e. operating at medium temperature. All catalysts, regardless of the composition, show the further formation only of small amounts of methanol (Table 3) without any other side products, in agreement with the high values of selectivity in $CO_2$ detected in all the reaction conditions. More detailed comparison are reported in the FIGS. 4-9.

Figure 4:
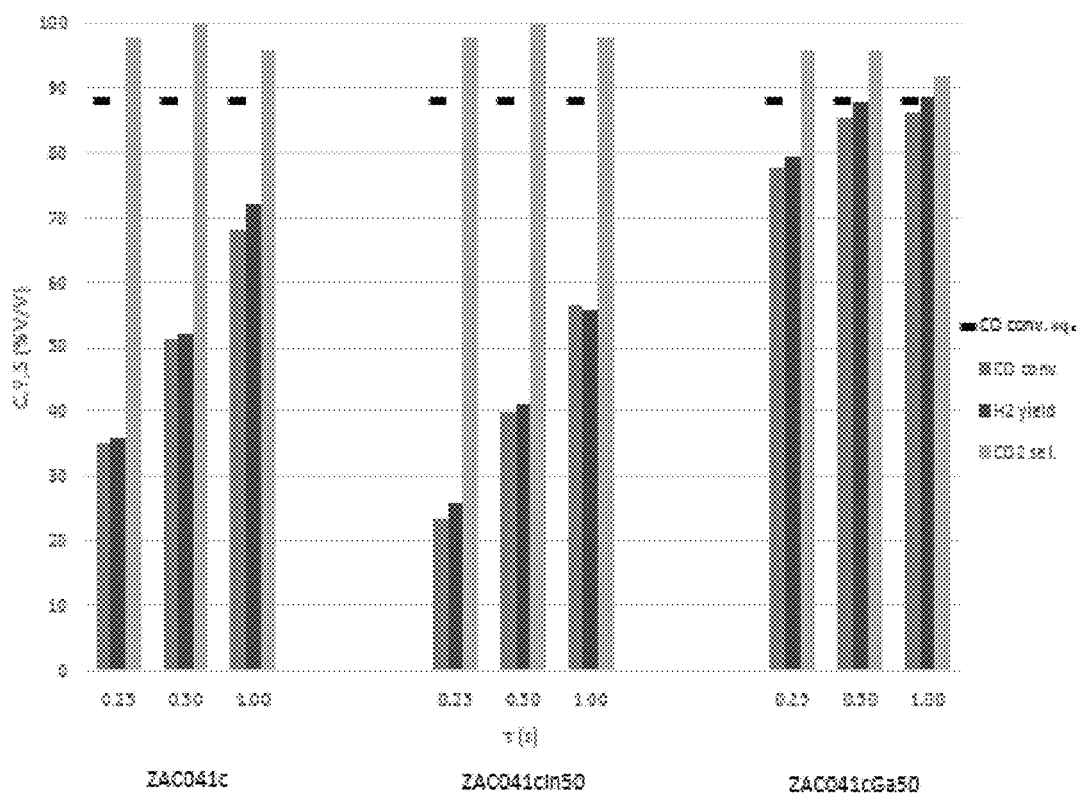
FIG. 4 illustrates the comparison of the activity for the ZAC041cM50 catalysts [(M(II)/M(III)=1 atomic ratio; Al/M=50 atomic ratio; M=Al, In or Ga], in accordance with one embodiment of the present invention.

FIG. 4 illustrates the comparison of the activity for the ZAC041cM50 catalysts [(M(II)/M(III)=1 atomic ratio; Al/M=50 atomic ratio; M=Al, In or Ga].

Figure 5:
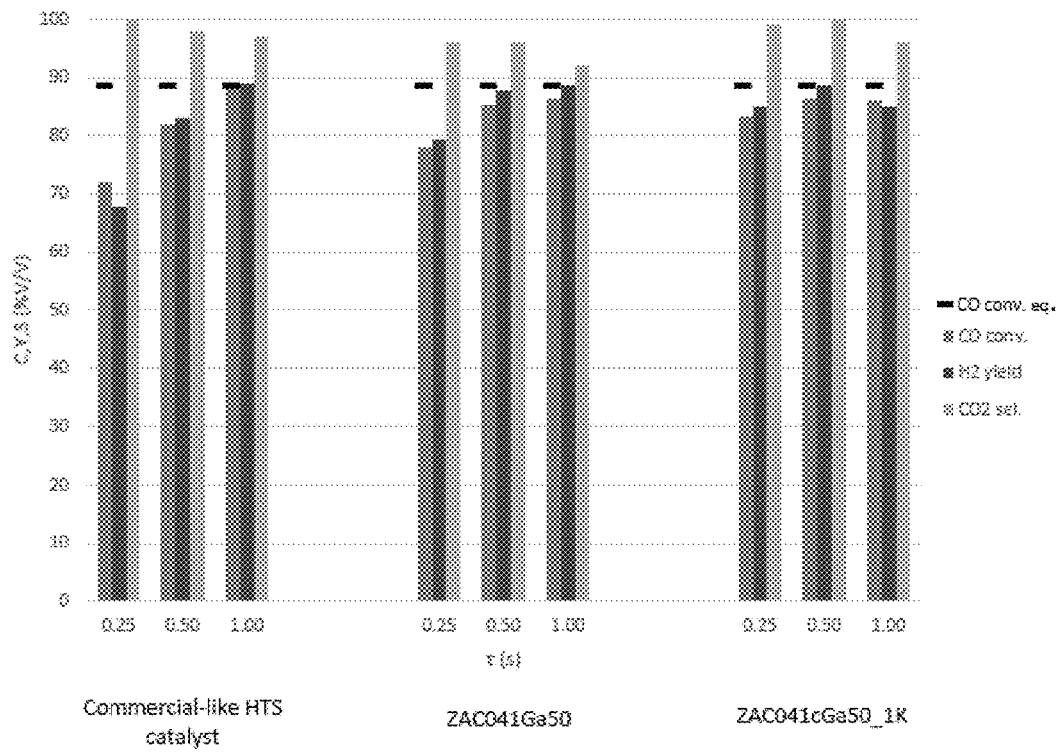
FIG. 5 illustrates the comparison of the activity for a commercial-like catalyst and ZAC041cGa50 one [M(II)/M(III)=1 as atomic ratio; Al/Ga=50 as atomic ratio], in accordance with one embodiment of the present invention.

FIG. 5 illustrates the comparison of the activity for a commercial-like catalyst and ZAC041cGa50 one [M(II)/M(III)=1 as atomic ratio; Al/Ga=50 as atomic ratio].

Figure 6:
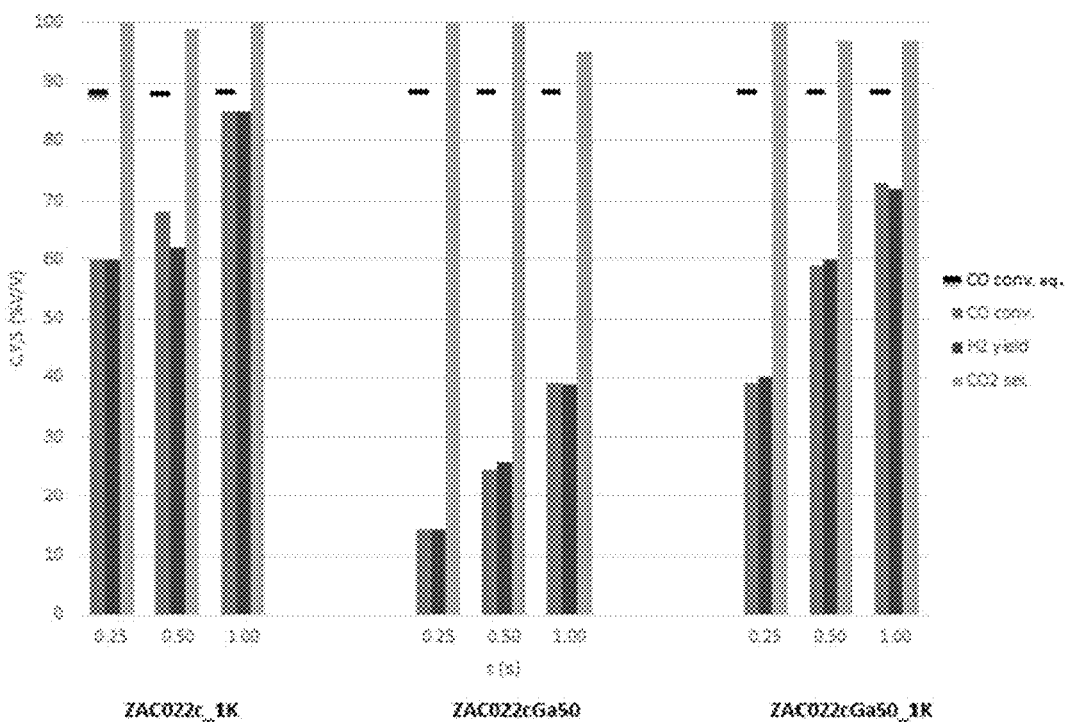
FIG. 6 illustrates the comparison of the activity of ZAC022cM50 undoped and K-doped catalysts [(M(II)/M(III)=2 as atomic ratio; Al/M=50 as atomic ratio; M=Al or Ga], in accordance with one embodiment of the present invention.

FIG. 6 illustrates the comparison of the activity of ZAC022cM50 undoped and K-doped catalysts [(M(II)/M(III)=2 as atomic ratio; Al/M=50 as atomic ratio; M=Al or Ga].

Figure 7:
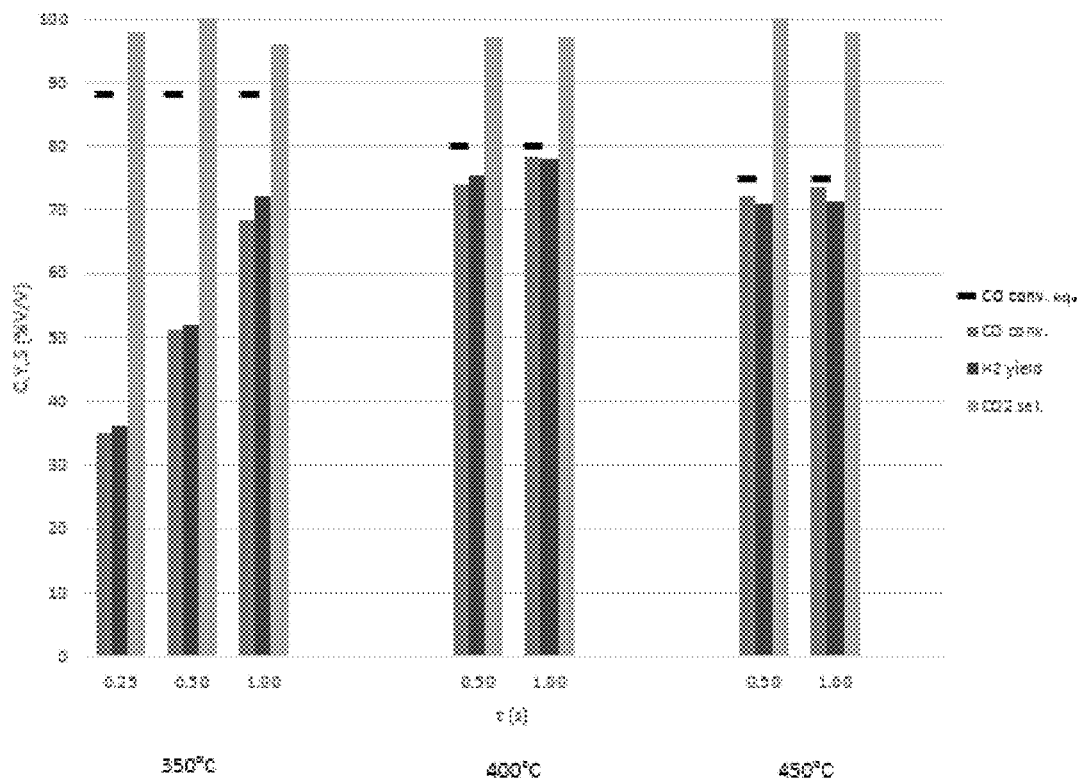
FIG. 7 illustrates the comparison of the activity at different temperature for the ZAC041c catalyst [(M(II)/M(III)=1 as atomic ratio], in accordance with one embodiment of the present invention.

FIG. 7 illustrates the comparison of the activity at different temperature for the ZAC041c catalyst [(M(II)/M(III)=1 as atomic ratio].

Figure 8:
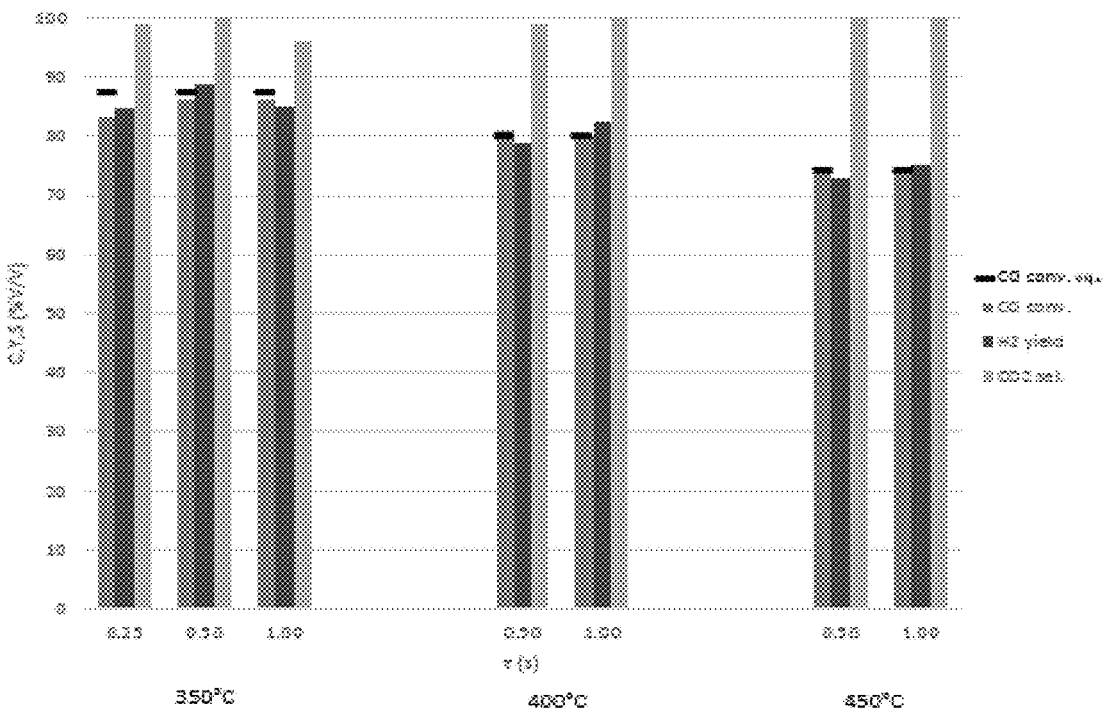
FIG. 8 illustrates the comparison of the activity at different temperatures for the K-doped ZAC041cGa50_1K catalyst [(M(II)/M(III)=1 as atomic ratio; Al/GA=50 as atomic ratio], in accordance with one embodiment of the present invention.

FIG. 8 illustrates the comparison of the activity at different temperatures for the K-doped ZAC041cGa50_1K catalyst [(M(II)/M(III)=1 as atomic ratio; Al/GA=50 as atomic ratio].

Figure 9:
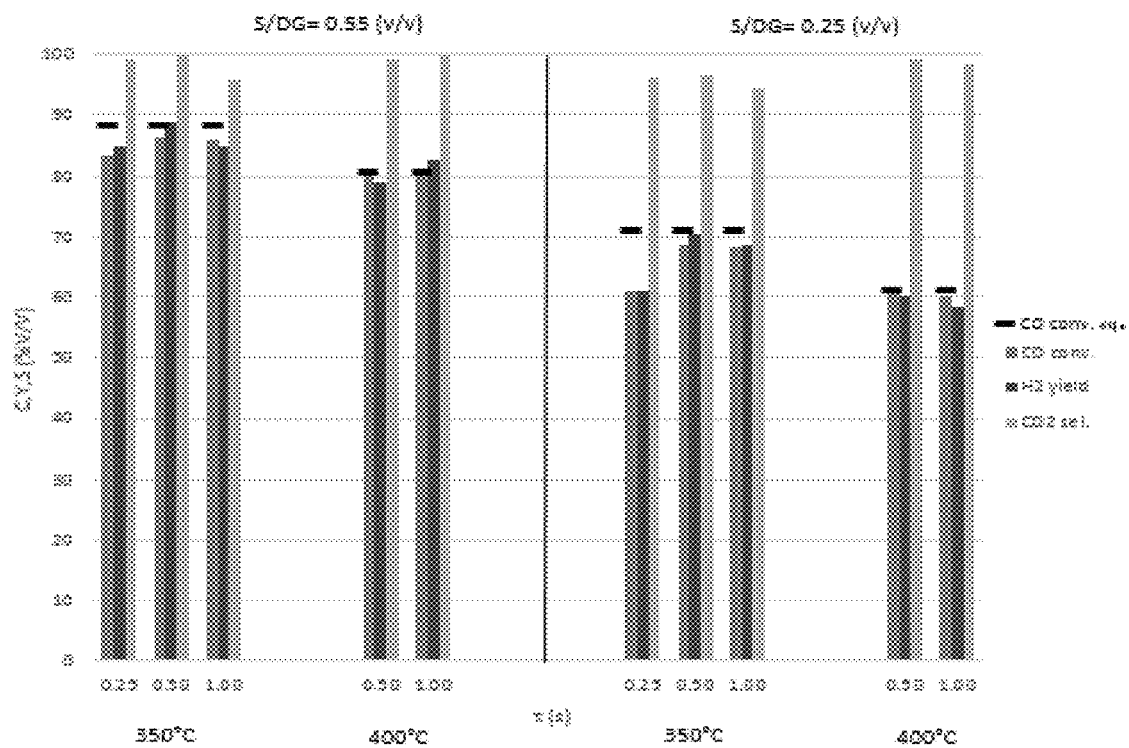
FIG. 9 illustrates the comparison of the activity at different temperature and S/DG volumetric ratio for the ZAC041cGa50_1K catalyst [(M(II)/M(III)=1 as atomic ratio; Al/Ga=50], in accordance with one embodiment of the present invention.

FIG. 9 illustrates the comparison of the activity at different temperature and S/DG volumetric ratio for the ZAC041cGa50_1K catalyst [(M(II)/M(III)=1 as atomic ratio; Al/Ga=50].

In particular FIG. 9 show a very good activity and stability of Ga-promoted catalysts also under hard reaction conditions, such as operating with a S/DG ratio significantly higher than those used in the industrial plants. On the other hand, low S/DG values offer very interesting economic advantages, allowing to improve the productivity, decreasing costs and reactor size. However, to have data on the stability of most wide application, the activity of ZAC041cGa_1K was investigated also in a lab scale pilot plant for long time-on-stream.

Stability of the ZAC041cGa50_1K catalyst was evaluated by means of a long duration test performed during more than 300 h for the same set of operating conditions. After loading in the reactor, the catalyst (9 g, 30/40 mesh) is activated at 320° C. by using a syngas mixture diluted in steam at a steam/carbon ratio=10 during 2 h, then temperature is increased following a ramp up to 400° C. for 3 hours.

After, the injection of steam is reduced in order to achieve a ratio Steam/DryGas (S/DG)=0.55, at a pressure of 15 bars. Inlet temperature is targeted at 390° C. and contact time value is close to 2 seconds. DG composition is H2/CO/CO2/CH4=0.75/0.168/0.041/0.041% mol.

During the long test, temperatures (in/out) are monitored and the resulting dry gas exiting the reactor is continuously analyzed by means of IR detectors (CO, CO2, CH4). At the outlet of the reactor, wet gas is quenched by a cooler, then after crossing a separator pot, dry gas is recovered at the top of the pot and condensates are collected at the bottom part.

During the 300 h of test, temperatures and composition of the gas remained stable. CO slip is in agreement with Equilibrium prediction with a CH4 content staying stable. No side product was detected in the gas phase and only some traces of MeOH present in the condensates were detected and again in agreement with Equilibrium.

Figure 10:
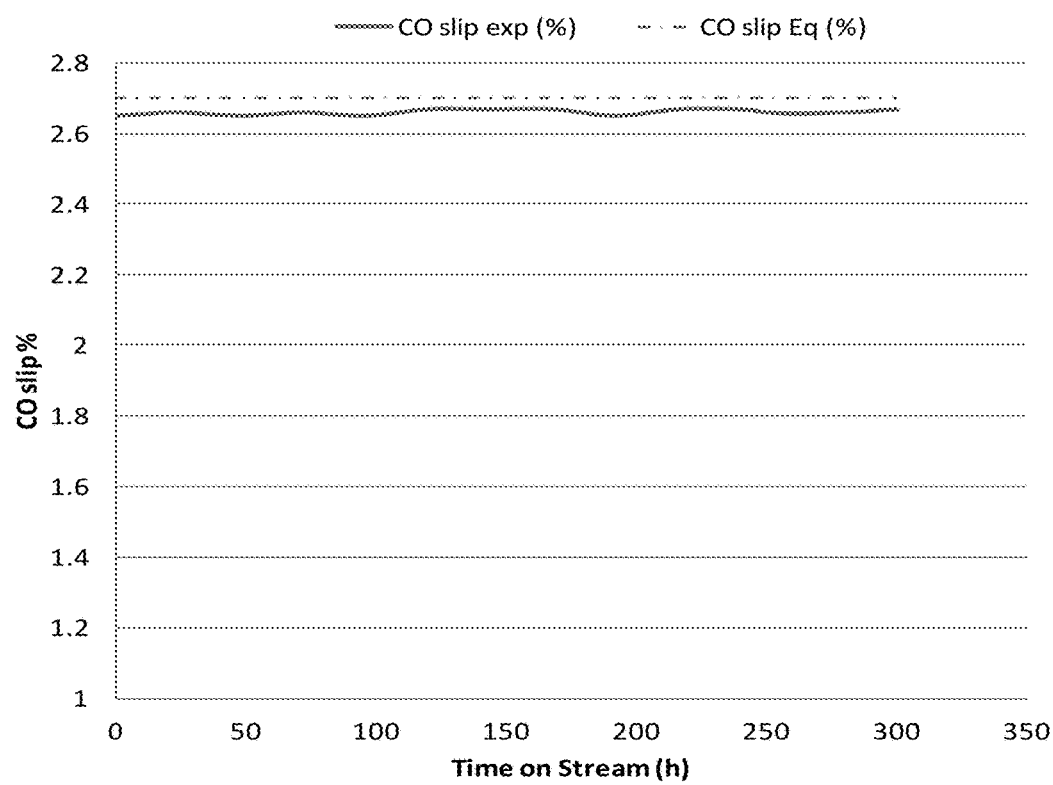
FIG. 10 illustrates the stability of the catalyst vs ToS, in accordance with one embodiment of the present invention.

The FIG. 10 presents the stability of the catalyst vs ToS (Time on stream).

Based on these results and uncertainties of measurements, we can consider that this new catalyst performs at Equilibrium without abnormal production of side-products.

Although catalysts described in the literature to operate in HTS conditions are made of Iron and Chromium, the catalysts of the present invention have a high activity operating in HTS conditions (form 350° C. to 450° C.) close to thermodynamic equilibrium with a very good stability upon time-on-stream, but without Iron and without Chromium.

Contrary to other patents claiming the use of ZnAl-based materials for HTS applications, the catalysts of the present invention also contain small amount of copper, which enable a fast start-up of the reaction and an activity also at temperatures lower than 350° C.

The addition of small amount of La or, mainly Ga, significantly increases the catalytic activity and stability. The behavior of Ga is very surprising considering the worsening observed with indium, since Al, Ga and In are all members of the III group of the Periodic Table of Elements.

The doping by a small percentage of potassium, improve further the performance of the Ga-promoted catalysts also at low temperature.

Furthermore, high activity and selectivity values were observed also operating at low contact time and S/DG values, i.e. in conditions of high industrial interest.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process to synthesize a catalyst for performing a water-gas shift reaction at a temperature more than 300° C. using a precursor having general formula:

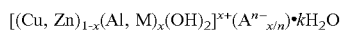

with:
M=Ga,
A=$CO_3$
$0.33 < x < 0.5$
$1 < n < 3$
Ga with Al/Ga ratio comprised between 0/1 and 100/1, the process comprising the following steps:
a) synthesizing the precursor by a coprecipitation method;
b) washing the precursor,
c) drying the precursor at a temperature between than 60° C. and 80° C.
d) calcination at a temperature more than 500° C.

2. The process of claim 1, wherein the step d) lasts between 2 h and 6 h with a speed in temperature rise between 5° C./min and 10° C./min.

3. The process of claim 1, wherein at the step b) the precursor is washed with deionized water at a temperature between 25° C. and 60° C.

4. The process of claim 1, wherein the synthesis of precursor comprises the following steps:
i) preparation of a copper, zinc, and aluminium salts aqueous solution,
ii) dropping of the aqueous solution into a solution containing of sodium bicarbonate by maintaining the pH to 9.0±0.1 to obtain a precipitate,
iii) ageing of this precipitate.

5. The process of claim 1, wherein the precursor has 0.5 to 5 wt % of copper and the catalyst has 0.5 to 5 wt % of copper.

6. The process of claim 1, wherein the catalyst has the general formula:

$$(Cu, Zn)_{1-x}(Al, M)_xO_x.$$

7. The use of the catalyst obtained by the process of claim 1 comprising converting CO from a synthesis gas mixture with a Steam/Dry Gas ratio of 0.1 to 0.9 in the presence of the catalyst produced by the process of claim 1.

* * * * *